United States Patent [19]

Schexnayder

[11] 4,009,864
[45] Mar. 1, 1977

[54] THROTTLING SLOT CONFIGURATION FOR A VALVE SPOOL

[75] Inventor: Lawrence F. Schexnayder, Joliet, Ill.

[73] Assignee: Caterpillar Tractor Co., Peoria, Ill.

[22] Filed: Feb. 4, 1975

[21] Appl. No.: 546,950

[52] U.S. Cl. .......................... 251/282; 137/625.69; 137/625.3

[51] Int. Cl.² ................... F16K 47/04; F16K 5/10; F16K 11/07

[58] Field of Search ............... 137/625.69, 625.33, 137/625.3, 625.37; 251/120, 282

[56] References Cited
UNITED STATES PATENTS

| | | | |
|---|---|---|---|
| 2,812,775 | 11/1957 | Hodgson | 251/282 X |
| 2,971,536 | 2/1961 | Junck et al. | 251/282 |
| 3,009,480 | 11/1961 | Miller | 251/282 X |
| 3,123,335 | 3/1964 | Darling | 251/282 |
| 3,198,212 | 8/1965 | Junck et al. | 137/625.37 |
| 3,556,155 | 1/1971 | Morris | 137/625.69 |

Primary Examiner—Arnold Rosenthal
Attorney, Agent, or Firm—Frank L. Hart

[57] ABSTRACT

A throttling slot is formed in a control valve spool and interconnects a reduced diameter portion and a peripheral surface of a land provided on the spool with the throttling slot including a pocket recessed into the land at an angle inclined in the direction opposite to the normal direction of movement of the spool for effecting fluid flow through the throttling slot, and a longitudinally extending groove from the pocket which terminates in an end intersecting the reduced diameter portion.

8 Claims, 5 Drawing Figures

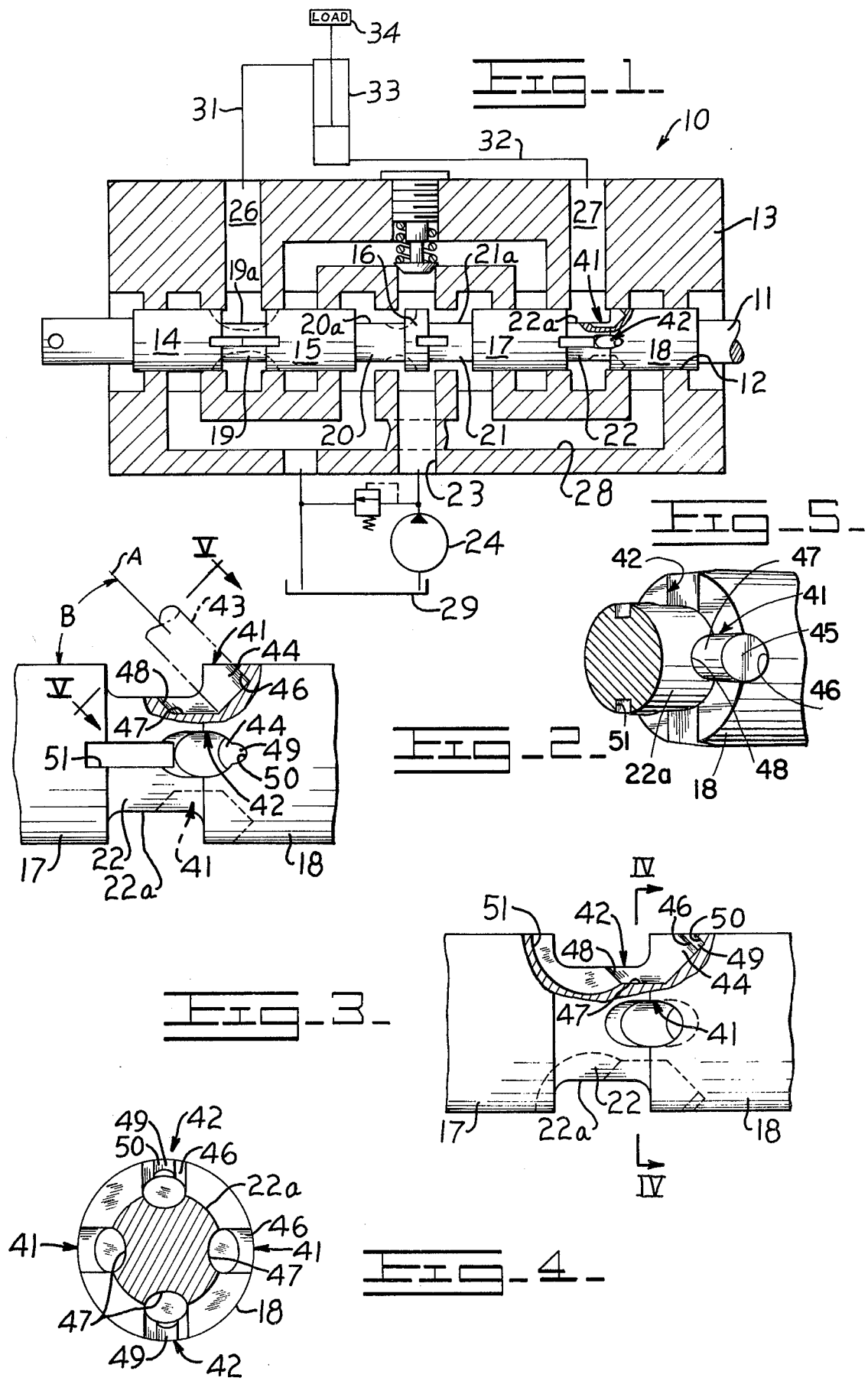

THROTTLING SLOT CONFIGURATION FOR A VALVE SPOOL

BACKGROUND OF THE INVENTION

Many valve spools of hydraulic control valves have a plurality of metering slots or notches formed thereon interconnecting a groove and an adjacent land. Since the action of opening or closing a port with a simple spool shoulder is relatively abrupt, the slots provide a slow metering effect and thus a desired gradual or smooth action of the fluid motor or jack controlled by the valve. Two of such slot configurations are disclosed in the U.S. Pat. Nos. 2,971,536 and 3,198,212 assigned to the assignee of the present application. The construction disclosed in the first mentioned patent is particularly suited for metering out while the construction of the last mentioned patent is best suited for metering in. The term "metering in" is employed in describing a valve wherein the metering is accomplished by fluid flow through the slots in a direction generally inward with respect to the valve spool whereas "metering out" is used to describe the condition where metering is accomplished by flow radially outwardly of the valve spool through the metering slots.

One of the difficulties encountered with the construction of the U.S. Pat. No. 2,971,536, is that of sizing the throttling notches to maintain sufficient cross sectional area for adequate strength in the area of the notches while providing acceptable fluid flow rates therethrough without creating an excessive pressure drop or a reactionary force from the jet flow of the fluid. In many cases, particularly on relatively small diameter spools, to obtain the desired fluid flow characteristics through the throttling notches, the notches are formed relatively deep in the spool creating a weakened area subject to possible breakage.

Conversely, reducing the size of the throttling notches to provide adequate strength reduces the cross sectional area of the fluid flow path in the face of the land so that the opening in the face acts as an orifice restricting fluid flow therethrough and creates a pressure drop between the high pressure fluid in the annular groove and the fluid in the throttling notches. This creates a jet flow of fluid through the opening in the face of the land such that the high velocity fluid impinges against the back of the slot creating a reactionary force on the spool. This requires either heavier spring pressure or greater operator effort to effect return of the spool to a normal or neutral position. The jet flow of fluid through the opening in the face also prevents the fluid flow from exitting the throttling notches in the desired radial direction. Furthermore, the exit opening of the throttling notches in the periphery of the land acts as a second orifice in series with the opening in the face of the land creating an additional pressure drop and further upsets the fluid flow through the throttling notches.

Objects of the Invention

Accordingly, an object of the invention is to provide an improved throttling slot configuration for a valve spool which minimizes dynamic reactionary forces acting axially against the valve spool while maintaining an adequate cross sectional area in the spool to minimize breakage of the spool.

Another object of the invention is to provide such an improved throttling slot configuration having a cross sectional area of a size so that the exit opening of the the throttling slot is the only restriction to fluid flow through the notches and provides precise control of the fluid flow therethrough.

BRIEF DESCRIPTION OF THE DRAWINGS

FIG. 1 is a side elevational view of a control valve in which a throttling slot embodying the principles of the present invention is incorporated.

FIG. 2 is an enlarged elevational view of a portion of a valve spool of the control valve of FIG. 1 with portions in section showing the throttling slot configuration.

FIG. 3 is a top elevational view of the portion of the valve spool of FIG. 2.

FIG. 4 is a cross sectional view through the valve spool taken along line IV—IV of FIG. 3.

FIG. 5 is a perspective view of the throttling slot as viewed from line V—V of FIG. 2.

DESCRIPTION OF THE PREFERRED EMBODIMENT

Referring more particularly to the drawings, a control valve is generally indicated by the reference numeral 10 and includes a valve spool 11 reciprocable in a bore 12 formed in a valve body 13. The valve spool has a plurality of lands 14, 15, 16, 17 and 18 which are axially separated by reduced diameter portions 19, 20, 21 and 22 forming annular grooves 19a, 20a, 21a and 22a. The valve spool controls fluid flow through an inlet port 23 receiving pressurized fluid from a pump 24 and is operational selectively to direct such pressurized fluid through either one of a pair of motor ports 26 and 27 while simultaneously communicating the other motor port with a drain passage 28 which is formed in the valve body and connected to a tank 29. A pair of conduits 31 and 32 connect the motor ports 26 and 27, respectively, to the rod end and head end of a hydraulic jack 33. Thus, axial movement of the valve spool to the left as viewed in FIG. 1 results in directing pressurized fluid through the port 27 and conduit 32 to extend the jack and raise a load 34 supported thereon while rightward movement of the spool results in retracting the jack and lowering the load.

As more clearly shown in FIGS. 2 and 3 two pair of throttling slots 41 and 42 are formed in the valve spool 11 and are circumferentially equally spaced. The throttling slots interconnect the reduced diameter portion 22 with the peripheral surface of the land 18. Each of the throttling slots 41 is formed by moving a flat bottom end mill cutting tool indicated by the phantom line at 43 into the land along its axis A with the axis disposed at an angle B relative to the axis of the valve spool and machining a cylindrical pocket in the valve spool to the desired depth. The angle B is selected from a range from 40° to 60° and in the present case is 45°. The attitude of the milling tool is maintained at angle B and either the valve spool is moved along its axis or the milling tool is moved in a path parallel to the valve spool machining a longitudinally extending groove communicating the cylindrical pocket with the reduced diameter portion.

In the finished form shown in the drawings, each of the throttling slots 41 includes a semicylindrical pocket 44 which is recessed in the land 18 adjacent to the groove 22a and is defined by a base surface 45 substantially perpendicular to the axis A and by a semicylindrical sidewall 46 inclined at an angle corresponding to angle B in a direction opposite to the direction which the valve spool is moved to lower the hydraulic jack. A longitudinally extending groove 47 is contiguously connected to the semicylindrical pocket and terminates in a semicylindrical end surface 48 which intersects with the reduced diameter portion 22. The semicircular end surface is substantially parallel to the sidewall 46. As is more clearly shown in FIG. 4, the longitudinally extending groove has an arcuate cross section configuration.

The configuration of the throttling slots 42 is substantially identical with the configuration of the throttling slots 41 with each of the throttling slots 42 including an additional semicylindrical recess or pocket 49 formed in the sidewall 46 and opening into the pocket 44 and land 18 forming an extension of the throttling slot. A sidewall 50 of the pocket 49 is substantially parallel to the sidewall 46. The cross sectional area of the pocket 49 is smaller than the cross sectional area of the pocket 44. Additionally, a pair of longitudinal metering slots 51 are formed in the reduced diameter portion 22 and land 17 in axial alignment with and intersecting the throttling slots 42 to communicate the reduced diameter portion with the land 17. The metering slots 51 are formed as by a cylindrical milling cutter moved radially inwardly to the desired depth. The semicylindrical pockets 44 may be used in combination with the throttling slots independently of the metering slots 51.

In operation the throttling slots 41 and 42 formed in the valve spool 11 are effective for metering fluid flow from the head end of the hydraulic jack 33 transmitted through the conduit 32, motor port 27 and into the drain passage 28 when the valve spool is moved to the right. When the hydraulic jack is supporting a load, the fluid in the motor port and annular groove 22a is pressurized so that as the semicylindrical pockets 44 and 49 open into the drain passage 28 a fluid flow path is created through the throttling slots and into the drain passage where the fluid is returned to the tank. The cross sectional area of the portion of the throttling slots in communication with the pressurized fluid in the annular groove is substantially greater than the cross sectional area of the portion of the throttling slots opening into the drain passage at the periphery of the land so that the only restriction to fluid flow through the throttling slots is the degree of opening of the throttling slots into the drain passage. Suitable stops, not shown, are provided to limit movement of the spool to the right so that the trailing edge of the land 18 does not enter the drain passage thereby establishing the maximum size of the opening of the throttle slots into the drain passage.

The angle of the sidewall 46 is selected so that as the throttling slots open into the drain passage 28 the fluid is directed substantially radially outwardly from the spool. This minimizes the dynamic reactionary force acting axially on the spool due to the flow of fluid passing through the throttling slots. For precise slow speed lowering of the hydraulic jack 33 the valve spool is shifted only sufficiently for the semicylindrical pockets 49 to open into the drain passage.

In view of the foregoing, it is readily apparent that the structure of the present invention provides an improved throttling slot configuration for a control valve which reduces the reactionary forces on the spool due to the jet flow of fluid therethrough while maintaining adequate strength in the spool to minimize breakage thereof. The cross sectional area of the portion of the throttling slots in communication with the pressurized fluid is always substantially greater than the cross sectional area of the portion of the throttling slots in communication with the drain passage such that the degree of opening into the drain passage controls the fluid flow through the throttling slots. The longitudinally extending groove connecting the semicylindrical pocket with the reduced diameter portion provides for the increased cross sectional area of the throttling slot while the angle of the semicylindrical sidewall directs the fluid substantially radially outwardly.

While the invention has been described and shown with particular reference to the preferred embodiment, it will be apparent that variations might be possible that would fall within the scope of the present invention which is not intended to be limited except as defined in the following claims.

What is claimed is:

1. In a control valve having a spool reciprocable along its axis within a bore formed in the valve with the spool having a reduced diameter portion and an axially adjacent land formed thereon for controlling fluid flow from a high pressure source to an area of low pressure upon movement of the spool in one direction in which the land leads the reduced diameter portion, wherein the improvement comprises:
   means forming a throttling slot in the spool interconnecting the reduced diameter portion and a peripheral surface of the land, said throttling slot including means forming a pocket recessed into the land and means forming a groove having sides which extend from the pocket longitudinally along the spool substantially parallel to the axis of the spool and an end connected to the sides and intersecting said reduced diameter portion, said pocket having a sidewall disposed remote from the groove and inclined relative to the axis of the spool in a direction radially outwardly and axially opposite to the one direction.

2. The combination of claim 1 wherein said pocket is semicylindrical and is connected to the sides of said longitudinally extending groove.

3. The combination of claim 2 wherein said longitudinally extending groove has an arcuate cross section and said end of the longitudinally extending groove is semicylindrical and is substantially parallel to said sidewall of the pocket.

4. The combination of claim 1 wherein said sidewall of said pocket is semicylindrical and is formed about an axis which is inclined relative to the axis of the spool at an angle in the range of approximately 40° to 60° with the axis of the spool and includes a base surface substantially normal to the axis about which said sidewall is formed.

5. The combination of claim 4 including means forming a semicylindrical recess in said sidewall of said pocket substantially parallel to the axis of the pocket and opening into the pocket and the peripheral surface of the land, said semicylindrical recess having a smaller cross sectional area than said pocket.

6. In a control valve having a spool reciprocable along its axis within a bore formed in the valve with the spool having a reduced diameter portion and an axially adjacent land formed thereon for communicating the reduced diameter portion with a port in the valve upon movement of the spool in one direction in which the land leads the reduced diameter portion for metering out fluid from the reduced diameter portion to the port, wherein the improvement comprises:

means forming a throttling slot in the spool leading from the reduced diameter portion to a peripheral surface of the land, said throttling slot having a first longitudinally extending surface substantially parallel to the axis of the spool, a second surface connected to an end of said longitudinal surface and intersecting said reduced diameter portion, a third surface connected to the other end of said longitudinal surface, a fourth surface extending between said third surface and said peripheral surface of said land and a pair of longitudinally extending sides each of which is connected to each of the first, second, third and fourth surfaces, said fourth surface being inclined relative to the axis of the spool in a direction radially outwardly and axially opposite to said one direction, said third surface being substantially perpendicular to said fourth surface and said second surface being substantially parallel to said fourth surface.

7. The combination of claim 1 wherein said throttling slot has a first cross sectional area at the peripheral surface of the land through which the fluid exits from the throttling slot, and a second cross sectional area at the edge of the land substantially perpendicular to the axis of the spool, said first cross sectional area being less than said second cross sectional area so that said first cross sectional area always controls the flow of fluid through the throttling slot.

8. In a control valve having a spool reciprocable along its axis within a bore formed in the valve with the spool having a reduced diameter portion and an axially adjacent land formed thereon for controlling fluid flow from a high pressure source to an area of low pressure upon movement of the spool in one direction in which the land leads the reduced diameter portion, wherein the improvement comprises:

means forming a throttling slot in the spool leading from the reduced diameter portion to a peripheral surface of the land, said throttling slot including means forming a pocket recessed into the land, and means forming a groove having sides which extend from the pocket longitudinally along the spool substantially parallel to the axis of the spool and an end connected to the sides and intersecting the reduced diameter portion, said pocket having a semicylindrical sidewall formed about an axis which is inclined relative to the axis of the spool in a direction axially opposite to said one direction, and a base surface substantially perpendicular to the sidewall.

* * * * *